US005276844A

United States Patent [19]

Aebi et al.

[11] Patent Number: 5,276,844

[45] Date of Patent: Jan. 4, 1994

[54] PROTECTION SYSTEM FOR CRITICAL MEMORY INFORMATION

[75] Inventors: Toni Aebi, Riedernrain; Philippe Wicht, Rue St. Joseph, both of Switzerland

[73] Assignee: Ascom Autelca Ltd., Switzerland

[21] Appl. No.: 740,427

[22] Filed: Aug. 5, 1991

[51] Int. Cl.[5] .............................................. G06F 15/20

[52] U.S. Cl. ..................................... 395/425; 364/569; 377/16

[58] Field of Search ........................... 364/464.02, 569; 377/16; 395/425, 725, 775

[56] References Cited

U.S. PATENT DOCUMENTS

| | | | |
|---|---|---|---|
| 4,376,299 | 3/1983 | Rivest | 380/23 |
| 4,566,106 | 1/1986 | Check, Jr. | 371/68.1 |
| 4,618,953 | 10/1986 | Daniels et al. | 371/12 |
| 4,639,918 | 1/1987 | Linkowski | 371/20 |
| 4,644,494 | 2/1987 | Muller | 395/425 |
| 4,644,541 | 2/1987 | Linkowski | 371/20 |
| 4,698,829 | 10/1987 | Di Giulio | 377/16 |
| 4,706,215 | 11/1987 | Kirschner et al. | 364/466 X |
| 4,710,882 | 12/1987 | Di Giulio et al. | 364/466 X |
| 4,742,469 | 5/1988 | Haines et al. | 364/466 |
| 4,746,818 | 5/1988 | Hafner | 307/363 |
| 4,752,950 | 6/1988 | Le Carpentier | 379/106 |
| 4,802,117 | 1/1989 | Chrosny et al. | 371/10.1 |
| 4,805,109 | 2/1989 | Kroll et al. | 364/464.02 |
| 4,837,702 | 6/1989 | Obrea | 364/466 |
| 4,843,572 | 6/1989 | Linkowski et al. | 101/350 X |
| 4,845,632 | 10/1989 | Kroll et al. | 364/464.02 |
| 4,998,203 | 3/1991 | Di Giulio et al. | 364/464.02 |
| 5,193,165 | 3/1993 | Eikill et al. | 364/DIG. 1 X |

FOREIGN PATENT DOCUMENTS

| | | | |
|---|---|---|---|
| 173249 | 3/1986 | European Pat. Off. | . |
| 230658 | 8/1987 | European Pat. Off. | . |
| 3421540 | 1/1986 | Fed. Rep. of Germany | . |
| 8911134 | 11/1989 | PCT Int'l Appl. | . |

*Primary Examiner*—Edward R. Cosimano
*Attorney, Agent, or Firm*—Brumbaugh, Graves, Donohue & Raymond

[57] ABSTRACT

A computer system, typically a postage member system, has a processor, a memory, an address decoder, and a window circuit. The window circuit selectively couples the write strobe output of the processor with the write strobe input of the memory in response to the processor's setting and clearing of a latched signal. A counter resets the processor if the latched signal is set and not cleared within a predetermined time period.

20 Claims, 3 Drawing Sheets

PROTECTION SYSTEM FOR CRITICAL MEMORY INFORMATION

BACKGROUND OF THE INVENTION

The invention relates generally to the protection of important or critical data in memory devices, and relates particularly to protection of such data in postage meters.

When important information is stored in a computer system it is commonplace to provide security against loss of some or all of the information, for example by making a backup copy of the information. In some systems, however, the information as stored in the system is what must be capable of being relied upon, and the theoretical feasibility of relying on backups is of little or no value. An example of such a system is the electronic postage meter, in which the amount of postage available for printing is stored in a nonvolatile memory. The user should not be able to affect the stored postage data in any way other than reducing it (by printing postage) or increasing it (by authorized resetting activities). Some single stored location must necessarily be relied upon by all parties (the customer, the postal service, and the provider of the meter) as the sole determinant of the value of the amount of postage available for printing. In electronic postage meters that single stored location is the secure physical housing of the meter itself. Within the secure housing one or more items of data in one or more nonvolatile memories serve to determine the amount of postage available for printing.

Experience with modern-day systems employing processors shows that it is advantageous to guard against the possibility of a processor running amok. Generally a processor is expected to execute its stored program and it is assumed the stored program contains no programming errors. Under rare circumstances, however, a processor may commence executing something other than the stored program, such as data. Under other rare circumstances the processor, even though it may be executing the stored program, nonetheless behaves incorrectly due to the incorrect contents of a processor register or a memory location. The former may occur if, for example, the instruction pointer or program counter of the processor changes a bit due to, say, absorption of a cosmic ray. The latter may occur if the contents of the processor register or memory location are changed by that or other mechanisms.

In pragmatic terms it is not possible to prove the correctness of a stored program; testing and debugging of the program serve at best to raise to a relatively high level (but not to certainty) the designer's confidence in the correctness of the code. Nonetheless an unforeseen combination of internal states, or an unforeseen set of inputs, has been known to cause a program that was thought to be fully debugged to proceed erroneously.

For all these reasons in systems where crucial data are stored in what is necessarily a single location under control of a processor running a stored program, it is highly desirable to provide ways to detect a processor running amok and to reduce to a minimum the likelihood of the processor's harming the crucial data. In the particular case of a postage meter, it is desirable that the amount of postage available for printing, also called the descending register, be recoverable by an authorized technician even if the system is completely inoperable from the customer's point of view, even after any of a wide range of possible processor malfunctions.

Numerous measures have been attempted to protect crucial data in such systems as postage meters. In a system having an address decoder providing selection outputs to the various memory devices in the system, it is known to monitor all the selection outputs of the address decoder, and to permit the processor's write strobe to reach certain of the memory devices only if (a) the address decoder has selected one of the certain memory devices, and (b) the address decoder has not selected any memory device other than the certain memory devices.

In another system having an address decoder providing selection outputs to the various memory devices in the system, it is known to monitor the selection outputs associated with certain of the memory devices, and to take a predetermined action if any of the selection outputs is selected for longer than a predetermined interval of time. The predetermined action is to interrupt the write strobe and selection outputs to the certain of the memory devices.

Although these approaches isolate the certain memory devices (typically the devices containing the crucial postage data) upon occurrence of some categories of malfunction, they do little or nothing to cure the malfunction when it is caused by a processor running amok. That is, it is important to distinguish the problems just mentioned from the problem of physical malfunction of a processor or other system component. Simple physical malfunction can be quite rare if conservative design standards are followed and if the system is used in rated ambient conditions, so that the frequency of occurrence of such physical malfunctions can be low. But many of the above-mentioned failure modes are not of a lasting physical nature and, if appropriately cleared, need not give rise to permanent loss of functionality.

It is also well-known to provide "watchdog" circuits in computerized systems. In such a system the code executed by the processor includes periodic issuance of a watchdog signal which serves to clear a watchdog circuit. If an excessive time passes without receipt of the watchdog signal, the watchdog circuit takes protective action such as shutting down the system or resetting the processor. The latter action has the advantage that it may restore normal processor function if, for example, the malfunction was due to a spurious change in the value of the instruction pointer or program counter. But the watchdog circuit only triggers after the passage of a predetermined interval, and processor malfunction could conceivably alter crucial data during the predetermined interval and prior to a watchdog-induced reset. It would be most desirable if crucial data could enjoy more comprehensive safeguards against processor malfunction, with the safeguards implemented in such a way as to permit restoration of proper processor function if possible.

SUMMARY OF THE INVENTION

In accordance with the invention there is provided a computer system, typically a postage meter system, comprising a processor (CPU) having a write strobe output and address outputs and executing a stored program, a memory having a selection input and a write strobe input, and an address-decoding means for providing a selection signal to the selection input of the memory in response to associated address outputs from the processor, the computer system including a window means comprising latch mean responsive to a setting signal and a clearing signal from the processor for coupling the write strobe output of the processor with the write strobe input of the memory when the latch means is set by the setting signal, and for decoupling the write strobe output of the processor from the write strobe input of the memory when the latch means is cleared by the clearing signal, and counter means responsive to the setting signal and the clearing signal from the processor for starting a counter upon receipt of the setting signal, for clearing the counter upon receipt of the clearing signal, and for interrupting the processor in the event of the counter reaching a predetermined threshold.

BRIEF DESCRIPTION OF THE DRAWINGS

The invention will be shown and described with reference to drawings, of which.

Like elements in the FIGURES have, where possible, been shown with like reference designations.

DETAILED DESCRIPTION

Figure 1:
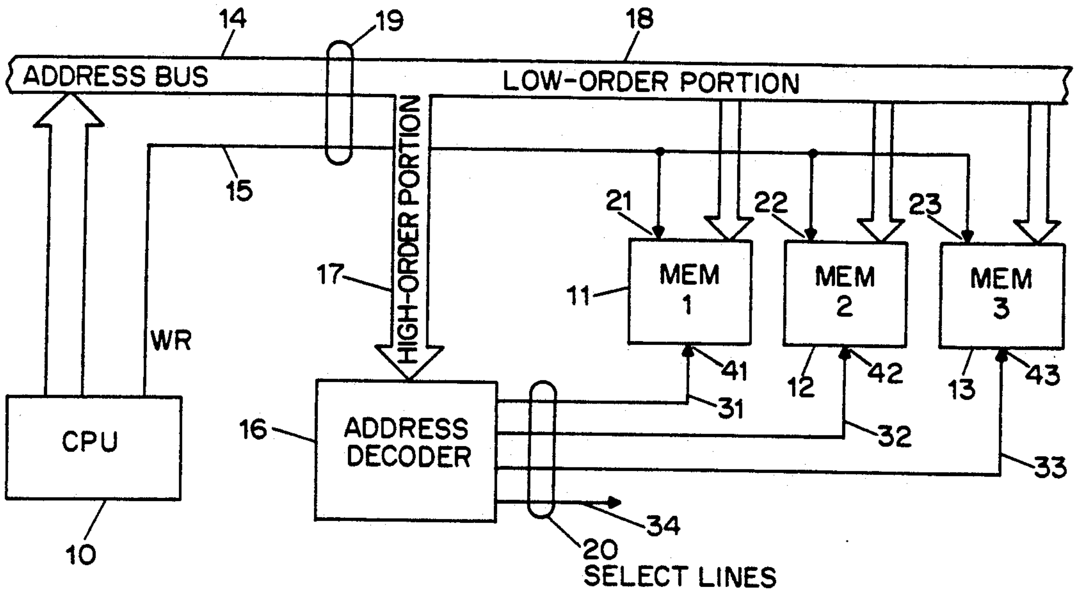
FIG. 1 PRIOR ART
FIGS. 1, 2, and 3 are functional block diagrams of prior art memory addressing systems.

In the typical prior art memory addressing system of FIG. 1, a processor 10 is capable of writing data to memory devices 11, 12, and 13 by means of a system bus 19, of which address bus 14 and write strobe line 15 are shown. Some of the address lines of address bus 14 are provided to a conventional address decoder 16, these so-called "high-order" address lines are shown as the high- order portion 17 of the address bus. The so-called "low-order" portion 18 of the address bus 14 is provided to memory devices 11, 12, and 13, and to other devices in the memory space of processor 10. For clarity the data lines and other control lines of the system bus 19 are omitted from FIG. 1, as are the other devices on the system bus, such as keyboard, display, read-only memory and printer.

In FIG. 1 the write strobe signal from the processor 10 is provided by a line 15 to the write strobe inputs 21, 22, 23 of the memory devices 11, 12, and 13 respectively. Memory device selection signals are provided by select lines 20 running from the address decoder 16 to "chip enable" inputs of the memory devices. For example, select lines 31, 32, and 33 provide respective select signals to corresponding chip enable inputs 41, 42, and 43 of the memory devices 11, 12, and 13, respectively.

A line 34 from address decoder 16 is indicative generally that the address decoder selects other memory devices than those shown explicitly in FIG. 1. Such memory devices typically include ROM (read-only memory), and memory-mapped input/output devices such as a keyboard, a display, a printer, and discrete input/output latches.

It will be noted that in the system of FIG. 1 the write strobe signal is provided to all memory devices, including 11, 12, and 13, whenever asserted on line 15 by the processor 10. If the processor 10 were misbehaving seriously (as distinguished from the case of a processor or other system component failing in a physical, permanent way) the processor 10 could provide addresses on the address bus 14 that were meaningful to the address decoder 16, enabling one or another of memory devices 11, 12, and 13 from time to time. If the write strobe signal of line 15 were asserted during one of the periods of enablement, the contents of some or all of the memory devices 11, 12, and 13 could be lost. In the case of a postage meter, the descending register contents could be lost, a matter of great concern for both the postal patron and the postal service.

Figure 2:
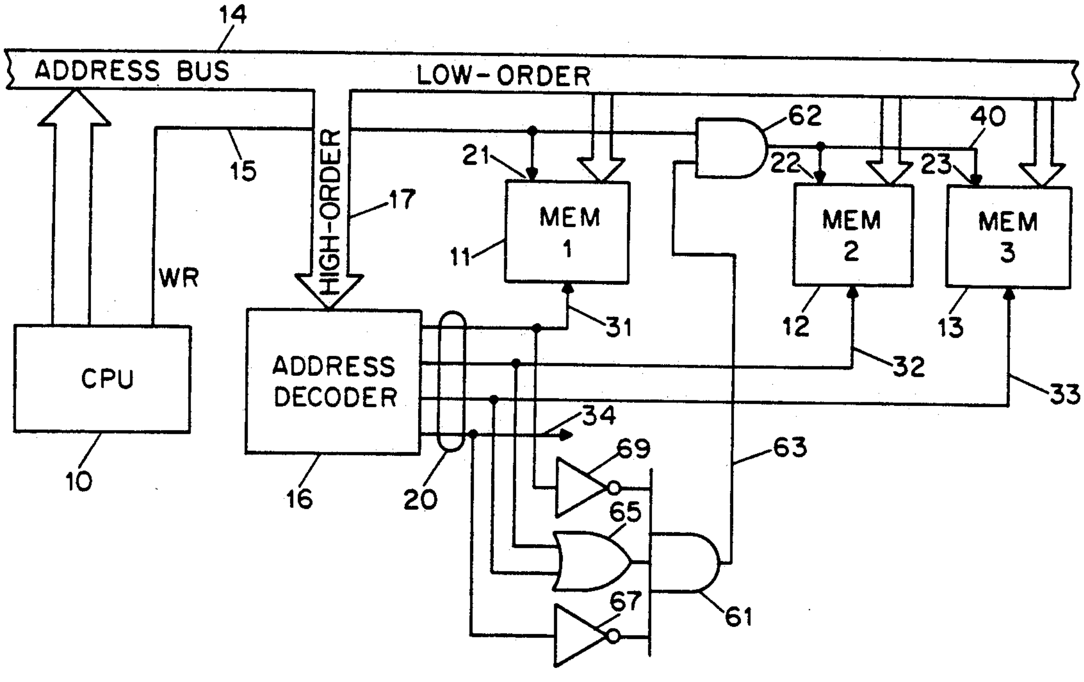
FIG. 2 PRIOR ART

FIG. 2 shows a known prior art system for enhancing the protection of selected memory devices, such as devices 12 and 13, here called "crucial" memory devices. Use of such a system might be prompted by the presence, in memory devices 12 and 13, of important postal data such as descending register data. In such a case memory devices 12 and 13 may be nonvolatile memories. While memory device 11 continues to receive the write strobe signal of line 15, just as in FIG. 1, it will be noted that the crucial memory devices 12 and 13 receive a gated signal 40 at respective write strobe inputs 22 and 23.

With further reference to FIG. 2, the selection outputs 20 of address decoder 16 are connected to respective memory devices as in FIG. 1. The system of FIG. 2 differs, however, in that the selection outputs 20 are also provided to multiple-input AND gate 61. The selection lines 32 and 33 for the crucial memory devices 12 and 13, respectively, are ORed at a gate 65 and provided directly to the AND gate 61. The remaining selection lines from the address decoder 16 are each inverted by inverters 67 and 69, as shown in FIG. 2, and provided to the AND gate 61. The address decoder 16 of FIG. 2 differs from many typical address decoders 16 such as shown in FIG. 1 in that every possible address of the high-order address bus 17 is decoded a one or another of the selection outputs 20. If necessary, a "none-of-the-above" selection output is provided to respond to addresses having no intended physical counterpart in the system design. The result is that the number of selection outputs 20 active at any given moment is exactly one, no more and no fewer.

It will be appreciated that the output 63 of AND gate 61 is high if (a) one of the crucial memory devices is selected and (b) none of the other memory devices is selected. Signal 63 is one of two inputs to AND gate 62; the other is the write strobe signal of line 15. The crucial memory devices, then, receive write strobe signals only when one or another of the crucial memory devices is currently being selected by the address decoder 16.

In the circumstances of a system suffering no mechanical defect, the system of FIG. 2 offers no protection of crucial data beyond that of FIG. 1. Assuming, for example, that the address decoder 16 and the address bus 14 and 17 are electrically intact, then the gates 61 and 62 have no effect. The gates 61 and 62 only serve to block write strobe inputs at 22 and 23 which would in any event be ignored by memory devices 12 and 13 because of the lack of asserted selection signals on lines 32 and 33. Stated differently, a processor 10 misbehaving seriously in a system of FIG. 2 that is electrically sound will be capable of destroying data in the crucial memory devices simply by presenting their addresses on the address bus 14. When the processor 10 presents a valid address on the address bus 14, the corresponding selection line, for example line 32, will be asserted and will be received at the chip-enable input 42 of memory device 12. Likewise, the a strobe signal on line 40 will be made available to the write strobe input 22 of memory device 12. The possible result is loss or damage to the contents of memory device 12.

Figure 3:
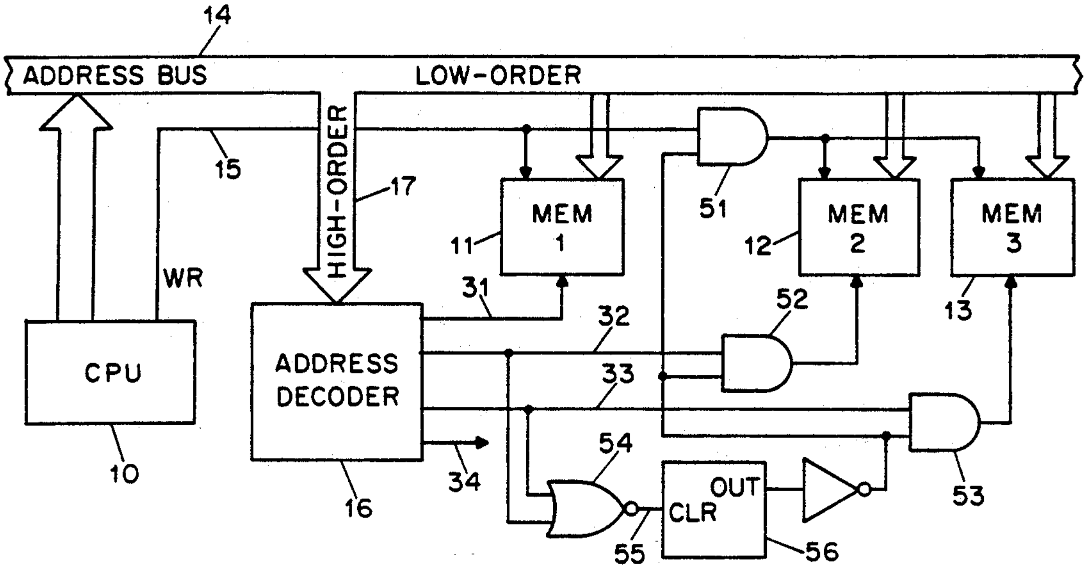
FIG. 3 PRIOR ART

FIG. 3 shows another prior-art system intended to protect data in crucial memory devices, say memory devices 12 and 13. In the system of FIG. 3, the processor 10, address bus 14 and 17, and address decoder 16 are as in FIG. 1. Memory device 11, which is not a crucial memory device, receives the write strobe signal of line 15 directly, as in FIG. 1, and receives its corresponding selection signal 31 directly, also as in FIG. 1.

Crucial memory devices 12 and 13, however, do not receive selection signals or the write strobe signal directly. Instead, AND gates 51, 52, and 53 are provided, blocking the selection signals 32 and 3 and the write strobe signal of line 15 under circumstances which will presently be described.

In the system of FIG. 3, the selection outputs for the crucial memory devices (here, selection signals 32 and 33) are provided to a NOR gate 54. Most of the time the processor 10 is not attempting access to the crucial memory devices 12 and 13, and so select signals 32 and 33 remain unasserted (here assumed to be a low logic level); as a result the output 55 of gate 54 is high. This clears counter 56.

At such time as the processor 10 attempts to read from or write to either of the crucial memory devices 12 or 13, a corresponding one of the selection lines 32 or 33 is asserted. Output 55 of gate 54 goes low, and counter 56 is able to begin counting.

Failure modes are possible in which an address line 32 or 33 may continue to be asserted for some lengthy period of time. For example, a mechanical defect in the address bus 14 and 17, in the address decoder 16, or in the wiring of lines 31, 32, 33, and 34, may give rise to continued selection of a crucial memory device 12 or 13. A consequence of such a mechanical defect could be a write instruction from the processor 10 that is intended for, say, memory device 11, but which, due to the mechanical malfunction, would cause a change in the contents of memory devices 12 or 13 as well.

Although as just described the system of FIG. 3 offers protection against certain mechanical failures, it provides only limited protection against the prospect of a processor misbehaving seriously. As will now be described, the system of FIG. 3 will fail to detect many of the possible ways a processor may misbehave, and will be successful at protecting against only a particular subset of the possible ways of misbehavior.

Those skilled in the art will appreciate that memory read and memory write instructions carried out on the system bus represent only a portion of all the bus activities. Prior to the processor's execution of an instruction forming part of the stored program, the processor must necessarily have fetched the instruction from a memory device on the system bus. From the point of view of an observer of the bus, the fetch activity is electrically very similar to a memory read activity, and each includes a step of the processor 10 providing an address on the system bus. The address decoder 16 handles memory read addresses the same way it handles fetch addresses. In a system functioning properly it is expected that the fetch addresses will represent retrieval of data (i.e. instructions for execution) only from locations that contain data, namely from the memory devices containing the stored program. In a system functioning properly it is also expected that fetching would never take place from locations containing data such as the descending register. In systems such as those discussed herein, where memory devices 12 and 13 are assumed to contain crucial data, it is expected that no fetching would take place from the memory devices 12 and 13. Indeed it would not be out of the ordinary for periods of time to pass in which fetches and memory accesses (either reading or writing) occurred on the system bus more or less in alternation.

Under the normal steps of a typical stored program (in a system having no mechanical defects) it is expected that processor 10, shortly after initiating bus access to an address giving rise to the assertion of selection lines 32 or 33, will proceed to bus access elsewhere in the address space of the processor. Such bus access elsewhere would reset the counter 56 and avert the decoupling of gates 51, 52, and 53.

As one example, the conventional fetching of instructions for execution may cause the address decoder to stop asserting selection lines 32 and 33 and to assert instead the selection line for some memory device containing stored program. This would be the usual process in a system lacking any mechanical defect. Thus, fetching (at least in a system that is free of mechanical defect) would generally keep the counter 56 reset more or less continuously, except in the special case of processor malfunction where the instruction pointer or program counter happened to point to a crucial memory.

It will be appreciated, then, that in the event of persistent assertion of one of the selection lines 32 or 33 due to a cause other than a mechanical defect, this would be expected to occur only if the processor happened to be fetching instructions for execution from the selected memory. Thus if the processor misbehaves seriously, and if it happens to be doing so while its instruction pointer or program counter is causing instructions (actually, data) to be fetched from the crucial data of one of the memories 12 and 13, the counter 56 would block access to the crucial memory device after the passage of a preset time interval.

In the more general case, however, of a processor misbehaving seriously with its instruction pointer or program counter causing instructions to be fetched from a memory device other than the crucial data, the counter 56 would be periodically cleared, bringing an end to any blocking of access (by gates 51, 52, and 53) to the crucial memory device. In summary, though the system of FIG. 3 protects against some mechanical failures, it does not comprehensively protect against the potential problem of a processor misbehaving seriously.

Figure 4:
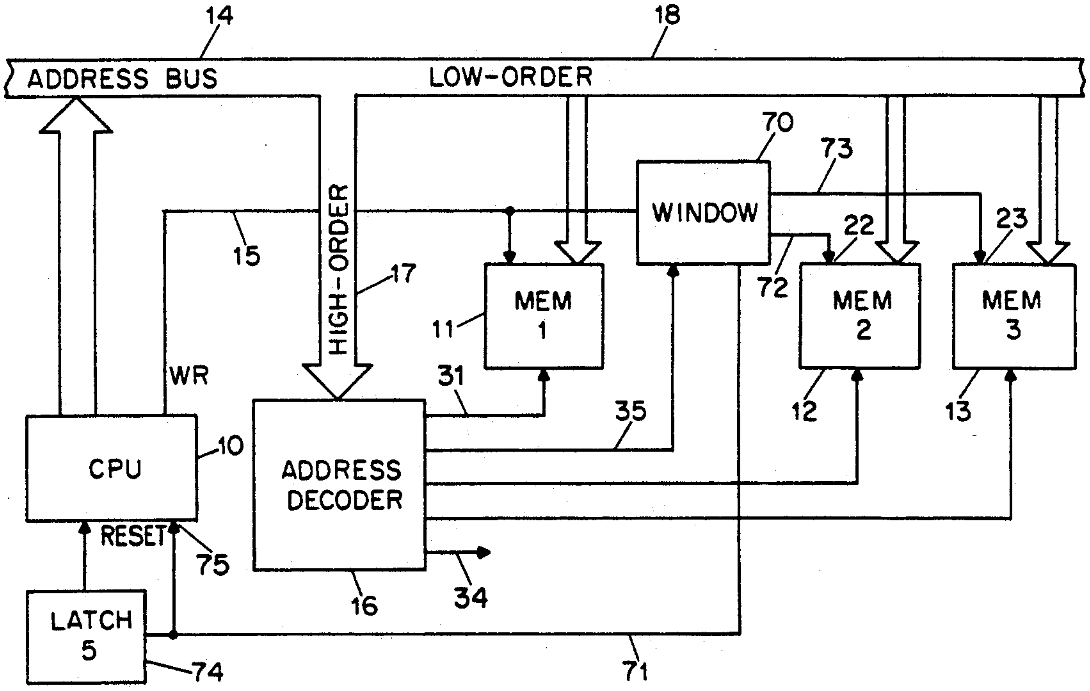
FIG. 4 is a functional block diagram of a memory addressing system according to the invention, including a window circuit.

Turning now to FIG. 4, a block diagram shows a system of an embodiment of the invention. Processor 10 provides address signals to the address bus 14 and to the address decoder 16, just as in the system of FIG. 1. The memory devices 11, 12, 13 all receive respective selection signals from the address decoder 16 just as in the system of FIG. 1. Memory device 11 receives the write strobe signal of line 15 as in the system of FIG. 1. Crucial memory devices 12 and 13, however, receive inputs at their write strobe inputs 22 and 23 not from line 15 but from a window circuit 70. Window circuit 70 receives requests from the processor 10 by I/O port transactions or, preferably, by memory-mapped I/O transactions. In the latter arrangement a selection signal 35 from address decoder 16 is provided to the window circuit 70, and preferably it also receives low-order address bits from low-order address bus 18.

Figure 5:
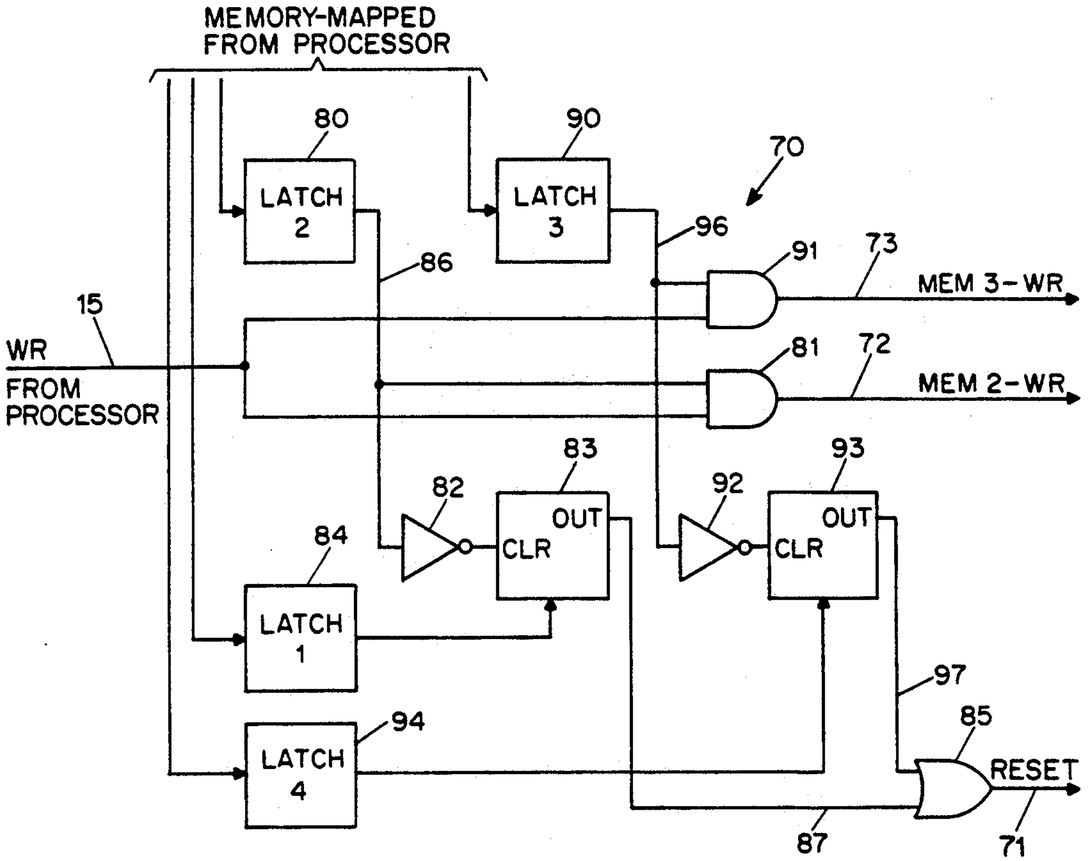
FIG. 5 is a functional block diagram of the window circuit of FIG. 4.

In FIG. 5, depicting the window circuit, an output 86 of latch 80 is normally low. The normally-low state of line 86 turns off an AND gate 81 so that a write strobe signal 72 for the memory 12 is unasserted. With the line 86 low, the write strobe signal of line 15 does not have any effect on the output 72 of the window circuit 70. For similar reasons an output 73 is also unasserted. The normally-low state of line 96 turns off an AND gate 91 so that a write strobe signal 73 for the memory 13 is unasserted.

When line 86 and a corresponding line 96 are both low, which is typically most of the time, a pair of counters 83, 93 are continuously cleared. Outputs 87 and 97 of the counters 83, 93 are thus both low, so that an OR gate 85 has a low output 71. The processor 10 receives the unasserted signal 71 at its reset input 75, so is permitted to continue normal execution of the stored program.

Under control of the stored program the processor 10 gains write access to crucial memory devices 12 or 13 as follows. Referring now to FIG. 5, to write to memory device 12 the processor writes a command to the latch 80 representative of a request for access. The output 86 of latch 80 goes high, turning on the gate 81 and permitting write strobe signals of the line 15 to be communicated to the output 72 of the window circuit, and thence to the write strobe input of memory device 12. The high level of line 86 causes an inverter 82 to go low, removing the clear input to the counter 83. Counter 83 commences counting, and if it reaches a preset threshold its output 87 goes high, turning on OR gate 85. This resets the processor 10. The preset threshold of counter 83 is changeable by commands to a latch 84 from the processor. In the normal course of execution of a stored program, typically the processor 10 would write a second command to latch 80 shortly after making its accesses to memory device 12, causing the output 86 of latch 80 to return to its normal, low state. This would reset the counter 83 and avert any resetting of the processor 10.

Similarly, if the processor 10 writes a command (called a setting signal) to a latch 90 to turn on the line 96, write access to the memory device 13 will be possible, the output of inverter 92 will go low, and the clock 93 will begin counting. In the normal course of events typically the processor 10 would fairly promptly write a second command (called a clearing signal) to latch 90, cutting off the write strobe signal to device 13 and clearing the counter 93. The counter 93 is programmable by commands to a latch 94. As a consequence, each of the counters is individually programmable. This is desired because the memories 12, 13 are preferably of different storage technologies, for which different writing and access times may apply. Thus a memory of a technology with a slow access time may be accommodated by programming its respective counter for a longer interval, while memory of a technology with a fast access time may be more closely protected by programming its respective counter for a shorter interval. It will be appreciated that latches 80, 84, 90, and 94 which form part of window circuit 70 may be memory-mapped latches.

In one embodiment it has been found preferable to provide additional logic in the circuit 70 of FIG. 5, so that the gate 81 is initially enabled by a flip-flop (not shown in FIG. 5) upon power-on, and continues to be enabled regardless of the state of latch 80. The additional logic is arranged so that a subsequent signal from the processor sets the flip-flop so that it no longer enables gate 81. From that point onwards the gate 81 is enabled only by the latch 80.

It has been found preferable to make the memories of differing technologies; in one embodiment the first memory is an EEPROM and the second memory is a battery-backed-up CMOS RAM. In the embodiment the first predetermined threshold is about 341 milliseconds, and the second predetermined threshold is about 682 milliseconds, all selected for an eight-bit processor running at 6 MHz.

Returning now to FIG. 4, the reset signal 71 may be seen which, if asserted, causes a reset to the processor 10 at its reset input 75. Generally this could be any hardware interrupt to the processor 10, but preferably it is the reset input, which may be thought of as the highest priority hardware interrupt. The reset input causes program execution from the instruction at memory location zero, thus eliminating any possible problem with spurious contents of the instruction pointer or program counter. The reset input also resets all other internal states of the processor 10, thus eliminating any possible problem with spurious internal states of the processor 10. Where the condition giving rise to one or another of the counters 83, 93 reaching its threshold was a processor misbehaving seriously, then, there is the possibility the processor will execute its stored program correctly thereafter.

Preferably a latch 74 is provided, external to the processor 10 and capable of latching the reset signal 71. The stored program for processor 10 preferably has steps that check, upon execution starting at zero, to see whether the latch 74 is set. If it is not, the assumption is that the execution from zero was due to initial application of power. If latch 74 is set, the assumption is that execution from zero was due to a reset from the window circuit 70, and the processor can appropriately note the event. Repeated notations of a reset due to the window circuit 70 will preferably cause the processor 10, under stored program control, to annunciate an appropriate warning message to the user.

It will be appreciated that the system of the invention offers numerous benefits over the prior art. As mentioned above the system of the invention offers more protection against the possibility of a processor misbehaving seriously. The counter 83 (or 93) starts counting with the event of the processor 10 sending the command to the latch 80 (or 90) for access to the memory device. This gives the counter a head start in detecting problems, as compared with the counter 56 of FIG. 3, which only starts counting with the occurrence of a selection signal from the address decoder 16. In the system of FIG. 5 the counter 83 (or 93) runs freely until such time as a command for ceasing access to the memory device is received at the latch 80 (or 90). In contrast in the system of FIG. 3 the counter 56 will be cleared every time the processor 10 happens to make reference, by memory reading and writing or by instruction fetching, to any address outside the crucial memories 12, 13. Finally, the protective action taken by the system of FIG. 3 is no more than interrupting the connection of write strobe and/or selection lines. In contrast, the system of FIGS. 4 and 5 takes the step of interrupting (and preferably resetting) the processor, which will at least sometimes remedy completely the condition giving rise to the malfunction.

While the above is a description of the invention in its preferred embodiment, various modifications, alternate constructions, and equivalents may be employed. Therefore, the above description and illustration should not be taken as limiting the scope of the invention, which is defined by the appended claims.

What is claimed is:

1. A computer system for protecting memory comprising a processor having a write strobe output and address outputs and executing a stored program, a first memory having a selection input and a write strobe input, an address-decoding means for providing a selection signal to the selection input of the first memory in response to associated address outputs from the processor, and window means, said window means comprising:

first latch means responsive to a first setting signal and a first clearing signal from the processor for coupling the write strobe output of the processor with the write strobe input of the first memory when the first latch means is set by the first setting signal, and for decoupling the write strobe output of the processor from the write strobe input of the first memory when the first latch means is cleared by the first clearing signal, and first counter means responsive to the first setting signal and the first clearing signal from the processor for starting a counter upon receipt of the first setting signal, for clearing the counter upon receipt of the first clearing signal, and for interrupting the processor in the event of the counter reaching a first predetermined threshold.

2. The computer system of claim 1 wherein the computer system further comprises a postage printer, and wherein the first memory contains information indicative of an amount of postage available for printing.

3. The computer system of claim 1 wherein the first counter means further comprises means responsive to receiving a command from the processor indicative of a first threshold value for setting the first predetermined threshold to the indicated value.

4. The computer system of claim 1 wherein the first latch means is a first memory-mapped latch, the first setting signal comprises a processor write command of a first predetermined data value to the first memory-mapped latch, and the first clearing signal comprises a processor write command of a second predetermined data value to the first memory-mapped latch.

5. The computer system of claim 1 wherein the first counter means further comprises a memory-mapped latch, and the command from the processor indicative of a threshold value comprises at least one processor write command to the memory-mapped latch.

6. The computer system of claim 1 wherein the processor has a reset input that resets the processor upon receipt of a reset signal, wherein the first counter means interrupts the processor by generating the reset signal.

7. The computer system of claim 1 further comprising second latch means responsive to receipt of the reset signal for storing information indicative of occurrence of the reset signal, the contents of said second latch means available as an input to the processor.

8. The computer system of claim 1 further comprising a second memory having a selection input and a write strobe input, the address-decoding means further providing a selection signal to the selection input of the second memory in response to associated address outputs from the processor, and the window means further comprising:

second latch means responsive to a second setting signal and a second clearing signal from the processor for coupling the write strobe output of the processor with the write strobe input of the second memory when the second latch means is set by the second setting signal, and for decoupling the write strobe output of the processor from the write strobe input of the second memory when the second latch means is cleared by the second clearing signal, and second counter means responsive to the second setting signal and the second clearing signal from the processor for starting a counter upon receipt of the second setting signal, for clearing the counter upon receipt of the second clearing signal, and for interrupting the processor in the event of the counter reaching a second predetermined threshold.

9. The computer system of claim 8 wherein the second counter means further comprises means responsive to receiving a command from the processor indicative of a threshold value for setting the second predetermined threshold to the indicated value.

10. The computer system of claim 8 wherein the first latch means is a first memory-mapped latch, the first setting signal comprises a processor write command of a first predetermined data value to the first memory-mapped latch, and the first clearing signal comprises a processor write command of a second predetermined data value to the first memory-mapped latch, and wherein the second latch means is a second memory-mapped latch, the second setting signal comprises a processor write command of a third predetermined data value to the second memory-mapped latch, and the second clearing signal comprises a processor write command of a fourth predetermined data value to the second memory-mapped latch.

11. The computer system of claim 8 wherein the second counter means further comprises a memory-mapped latch, and the command from the processor indicative of a threshold value comprises at least one processor write command to the memory-mapped latch.

12. The computer system of claim 8 wherein the second counter means interrupts the processor by generating the reset signal.

13. The computer system of claim 8 wherein the second predetermined threshold is set to an interval longer than that of the first predetermined threshold.

14. The computer system of claim 13 wherein the first memory is an EEPROM, the second memory is a battery-backed-up CMOS RAM, the first predetermined threshold is no greater than about 341 milliseconds, and the second predetermined threshold is no greater than about 682 milliseconds.

15. A method for protecting memory for use in a computer system comprising a processor having a write strobe output and address outputs and executing a stored program, a memory having a selection input and a write strobe input, an address-decoding means for providing a selection signal to the selection input of the memory in response to associated address outputs from the processor, and window means, said window means comprising: latch means responsive to a setting signal and a clearing signal from the processor for coupling the write strobe output of the processor with the write strobe input of the memory when the latch means is set by the setting signal, and for decoupling the write strobe output of the processor from the write strobe input of the memory when the latch means is cleared by the clearing signal, and counter means responsive to the setting signal and the clearing signal from the processor for starting a counter upon receipt of the setting signal, for starting a counter upon receipt of the setting signal, for clearing the counter upon receipt of the clearing signal, and for interrupting the processor in the event of the counter reaching a predetermined threshold; the method comprising the steps of:

generating the setting signal;

starting the counter; and writing to the memory.

16. The method of claim 15 further comprising the step of generating the clearing signal, performed after the writing step.

17. The method of claim 15 wherein the counter means further comprises means responsive to receiving a command from the processor indicative of a threshold value for setting the predetermined threshold to the indicated value, the method further comprising, prior to the step of generating the setting signal, the step of receiving at the counter means a command indicative of the threshold value.

18. The method of claim 15 wherein the predetermined threshold defines a interval, the method further comprising the step of interrupting the processor if the interval passes after the writing step in the absence of generation of the clearing signal.

19. The method of claim 17 wherein the processor has a reset input that resets the processor upon receipt of a reset signal, wherein the interrupting step further comprises resetting the processor.

20. The method of claim 19 wherein the system further comprises second latch means responsive to receipt of the reset signal for storing information indicative of occurrence of the reset signal, the contents of said second latch means available as an input to the processor, the method further comprising the step, following the resetting of the processor, of receiving an input from the second latch means.

* * * * *